(12) United States Patent
Doi et al.

(10) Patent No.: US 9,582,045 B2
(45) Date of Patent: Feb. 28, 2017

(54) COUPLING STRUCTURE FOR INPUT DEVICES

(71) Applicant: LENOVO (SINGAPORE) PTE. LTD., Singapore (SG)

(72) Inventors: Toshihisa Doi, Kanagawa-ken (JP); Mitsuo Horiuchi, Kanagawa-ken (JP); Eiji Shinohara, Tokyo (JP)

(73) Assignee: Lenovo (Singapore) PTE LTD, Singapore (SG)

( * ) Notice: Subject to any disclaimer, the term of this patent is extended or adjusted under 35 U.S.C. 154(b) by 0 days.

(21) Appl. No.: 14/943,901

(22) Filed: Nov. 17, 2015

(65) Prior Publication Data

US 2016/0139637 A1    May 19, 2016

(30) Foreign Application Priority Data

Nov. 18, 2014   (JP) ................. 2014-233738

(51) Int. Cl.
*G06F 1/16*    (2006.01)

(52) U.S. Cl.
CPC .......... *G06F 1/1679* (2013.01); *G06F 1/1684* (2013.01)

(58) Field of Classification Search
CPC .......................... G06F 1/1679; G06F 1/1684
See application file for complete search history.

(56) References Cited

U.S. PATENT DOCUMENTS

2008/0260454 A1    10/2008   Girodo et al.

FOREIGN PATENT DOCUMENTS

| JP | 01105005 | 4/1989 |
|----|----------|--------|
| JP | 2008003714 A | 1/2008 |
| JP | 2011094754 A | 5/2011 |
| JP | 2013-025422 A | 2/2013 |
| JP | 2013-122729 A | 6/2013 |
| WO | 2011142190 A1 | 11/2011 |

*Primary Examiner* — Anthony Q Edwards
(74) *Attorney, Agent, or Firm* — Antony P. Ng; Russell Ng PLLC

(57) ABSTRACT

A coupling structure capable of coupling a metal plate-like member and a resin chassis member with high assembling efficiency and sufficient coupling strength while preventing damage to parts is disclosed. The coupling structure is a structure for coupling a housing plate as a resin chassis member to a base plate as a metal plate-like member in a direction to overlap the housing plate with the base plate. The housing plate includes a latch having a pair of arm members extending along a direction parallel with a coupling face to the base plate and whose distal ends are spaced out from each other, and the base plate includes a coupling hook formed upright toward the side of the housing plate and engaged between the pair of arm members.

8 Claims, 17 Drawing Sheets

10

FRONT SIDE ← → REAR SIDE

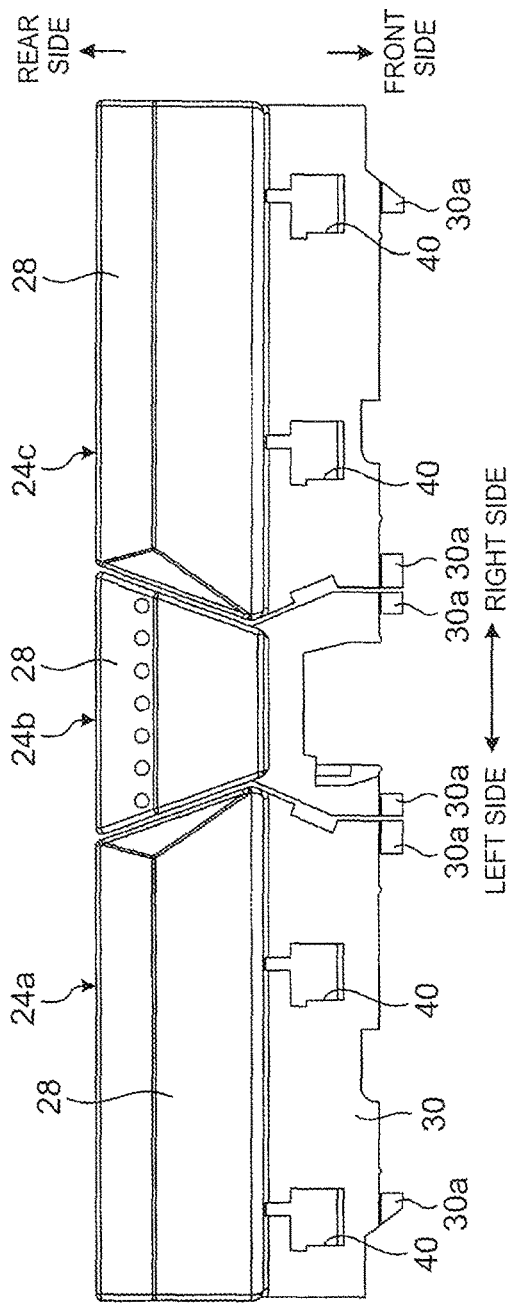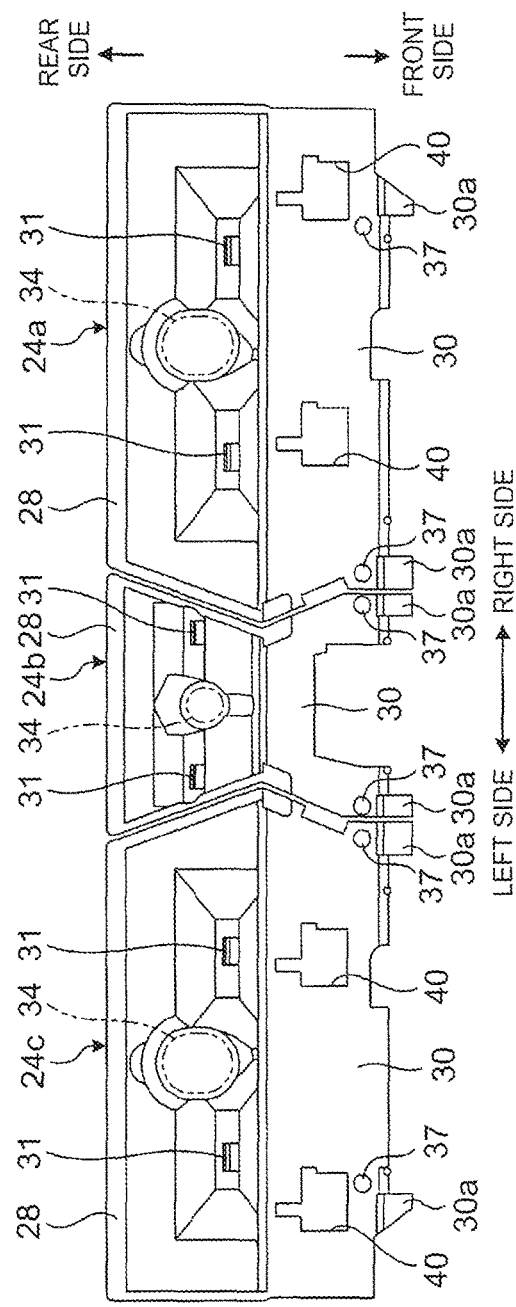
FIG. 4A
FIG. 4B

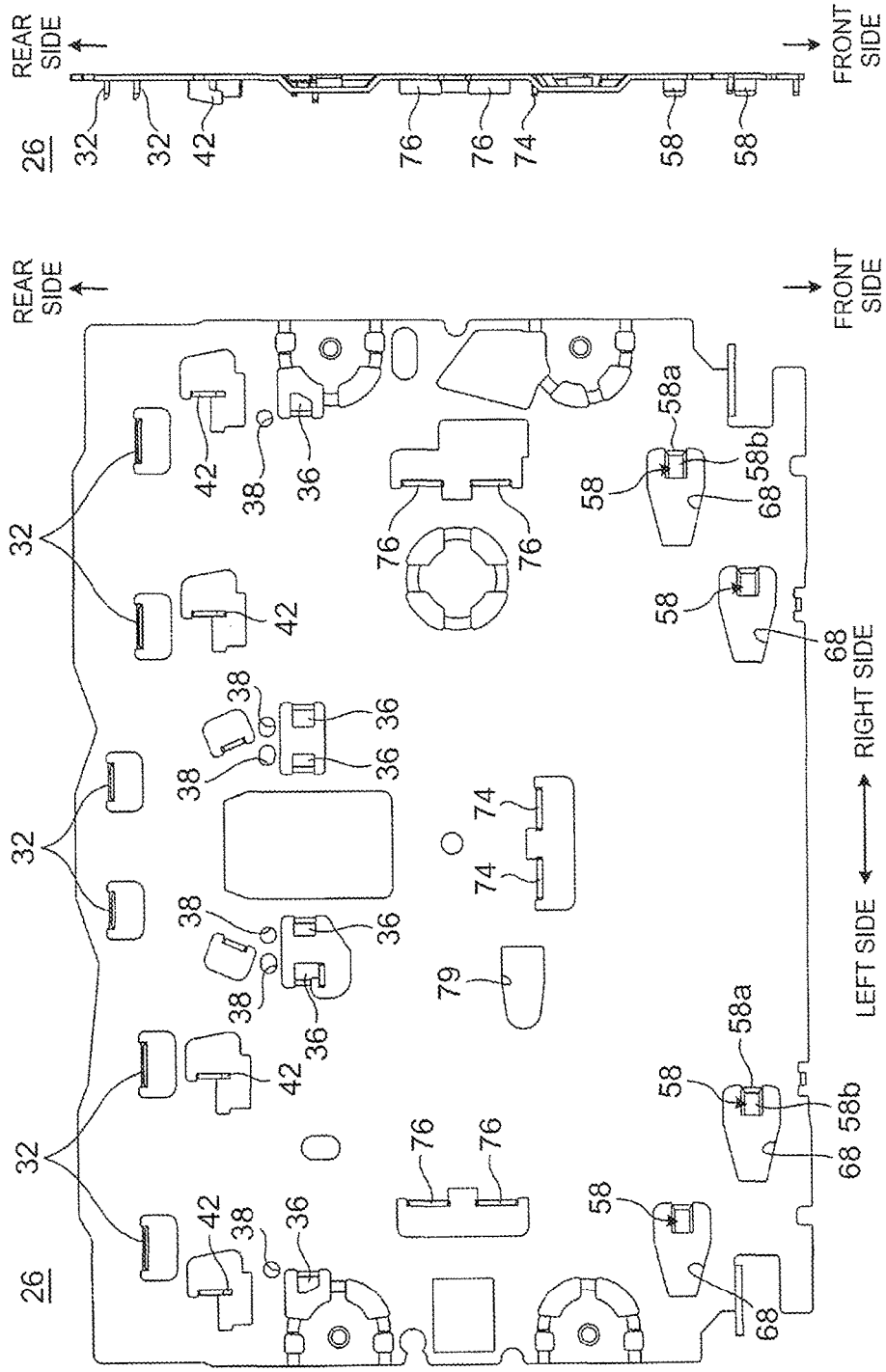

COUPLING STRUCTURE FOR INPUT DEVICES

PRIORITY CLAIM

The present application claims benefit of priority under 35 U.S.C. §§120, 365 to the previously filed Japanese Patent Application No JP2014-233738 with a priority date of Nov. 18, 2014, which is incorporated by reference herein.

BACKGROUND OF THE INVENTION

1. Technical Field

The present invention relates to input devices having a coupling structure in general, and particularly to a coupling structure for coupling a resin chassis member to a metal plate-like member in a direction to overlap each other.

2. Description of Related Art

For an input device having a coupling structure to couple a resin keyboard frame to a metal base plate in a direction to overlap each other, a locking hole opened downward or laterally in the lower surface of a frame is provided, and a locking claw projecting upward towards the frame side is provided on the top face of a base plate. Then, the frame and the base plate are slide relative to each other after the locking claw is inserted into the locking hole to put the locking hole and the locking claw into an engaging state.

In the above-mentioned structure, since the locking hole and the locking claw project towards a coupling direction in which the frame and the base plate overlap, there is a problem that it is difficult to make the structure thinner.

Further, in the above-mentioned structure, the locking hole and the locking claw are engaged with each other by sliding them. However, in order to further improve the assembling efficiency, a structure is considered in which, for example, the locking hole and the locking claw are pressed in the up-and-down direction without sliding them to engage them directly. In this structure, however, an engaging claw is required to be flexed and deformed to some extent when engaged in the locking hole. In other words, it is necessary to further increase the amount of upward projection in order to secure a sufficient flexural amount of the engaging claw, and this makes it further difficult to make the structure thinner. In addition, in order to prevent the engaging state from being released when an impact is given, it is necessary to set a sufficient engagement allowance between the locking hole and the locking claw, and there is concern that the flexural amount of the locking claw may exceed an acceptable amount during the assembly to damage the locking claw.

Consequently, it would be desirable to provide a coupling structure capable of coupling a metal plate-like member and a resin chassis member with high assembling efficiency and sufficient coupling strength while preventing damage to parts.

SUMMARY OF THE INVENTION

In accordance with a preferred embodiment of the present invention, a coupling structure is a structure for coupling a housing plate as a resin chassis member to a base plate as a metal plate-like member in a direction to overlap the housing plate with the base plate. The housing plate includes a latch having a pair of arm members extending along a direction parallel with a coupling face to the base plate and whose distal ends are spaced out from each other, and the base plate includes a coupling hook formed upright toward the side of the housing plate and engaged between the pair of arm members.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein:

FIG. 4A is a top view of a push button, and FIG. 4B is a bottom view of the push button;

FIG. 5A is a top view of a base plate, and FIG. 5B is a right side view of the base plate;

FIG. 12A is a view showing a state before disassembly, and FIG. 12B is a view showing a state of being in the process of disassembly with a tool;

FIG. 13A is a view showing a state before the disassembly, and FIG. 13B is a view showing a state after the disassembly;

DETAILED DESCRIPTION OF A PREFERRED EMBODIMENT

Figure 1:
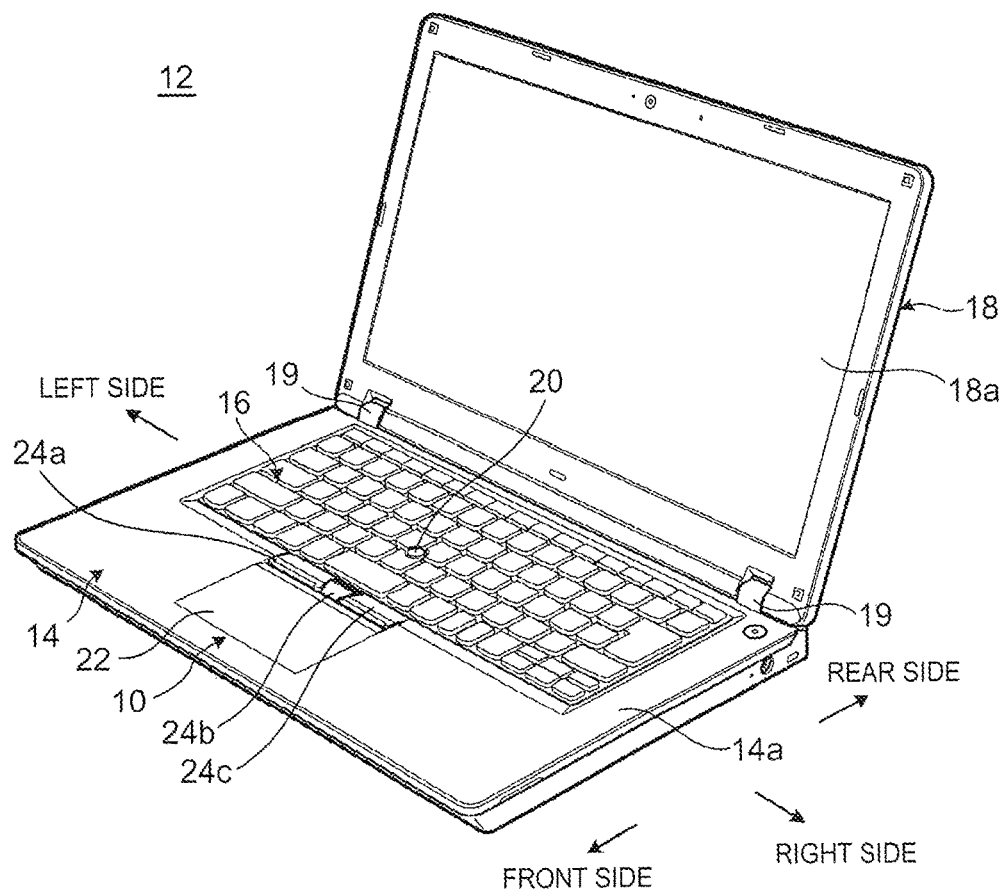
FIG. 1 is a perspective view of an electronic device having an input device in accordance with a preferred embodiment of the present invention.

Referring now to the drawings and in particular to FIG. 1, there is depicted a perspective view of an electronic device 12 having an input device 10 in accordance with a preferred embodiment of the present invention. The following description will be made while referring to the near side as the front side (front), the far side as the rear side (rear), the thickness direction of a main body chassis 14, which constitutes the electronic device 12, as the up-and-down direction, and the width direction thereof as the right-and-left direction, based on the usage pattern of the input device 10 in the electronic device 12 shown in FIG. 1.

As shown in FIG. 1, the electronic device 12 is a laptop PC including the main body chassis 14 having the input device 10 and a keyboard device 16, and a display chassis 18 having a display device 18a such as a liquid crystal display. The display chassis 18 is connected openably and closably to the main body chassis 14 by a pair of right and left hinges 19.

Various electronic components, not shown, such as a substrate, a processor, a hard disk drive, and a memory, are housed in the main body chassis 14. The input device 10 and the keyboard device 16 are arranged in a front-rear relationship on the top face 14a of the main body chassis 14. A pointing stick 20 is provided substantially at the center of the keyboard device 16.

The pointing stick 20 is to control a cursor (mouse pointer) displayed on the display device 18a, which is input means for carrying out an operation as a substitute for the mouse.

In the embodiment, the above-mentioned configuration with the input device 10 mounted in the electronic device 12 as a laptop PC is illustrated, but the input device 10 may also be mounted in a stand-alone keyboard device or the like connected to a desktop PC or the like. Next, a configuration example of the input device 10 will be described.

Figure 2:
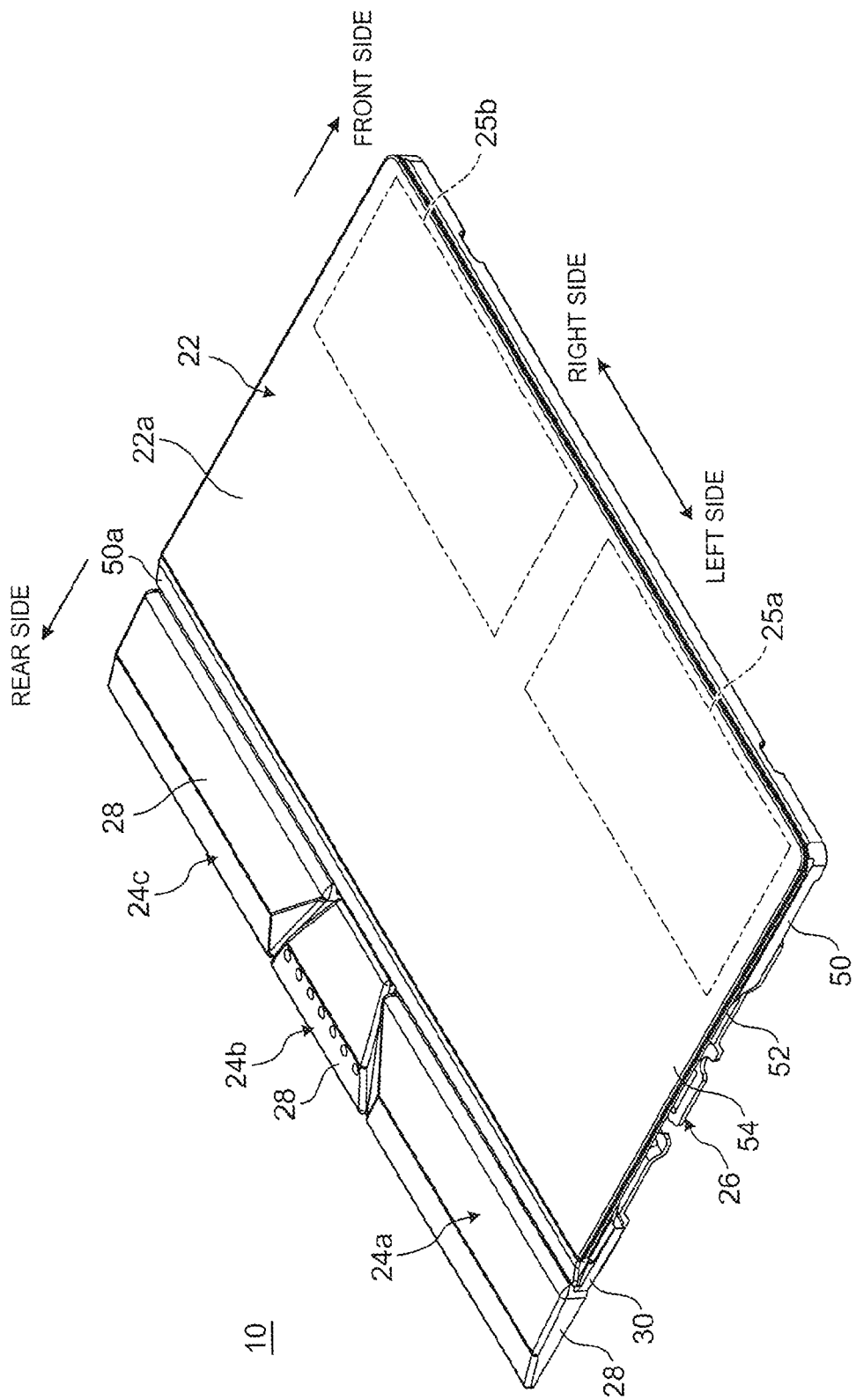
FIG. 2 is a perspective view of an input device in accordance with a preferred embodiment of the present invention.
Figure 3:
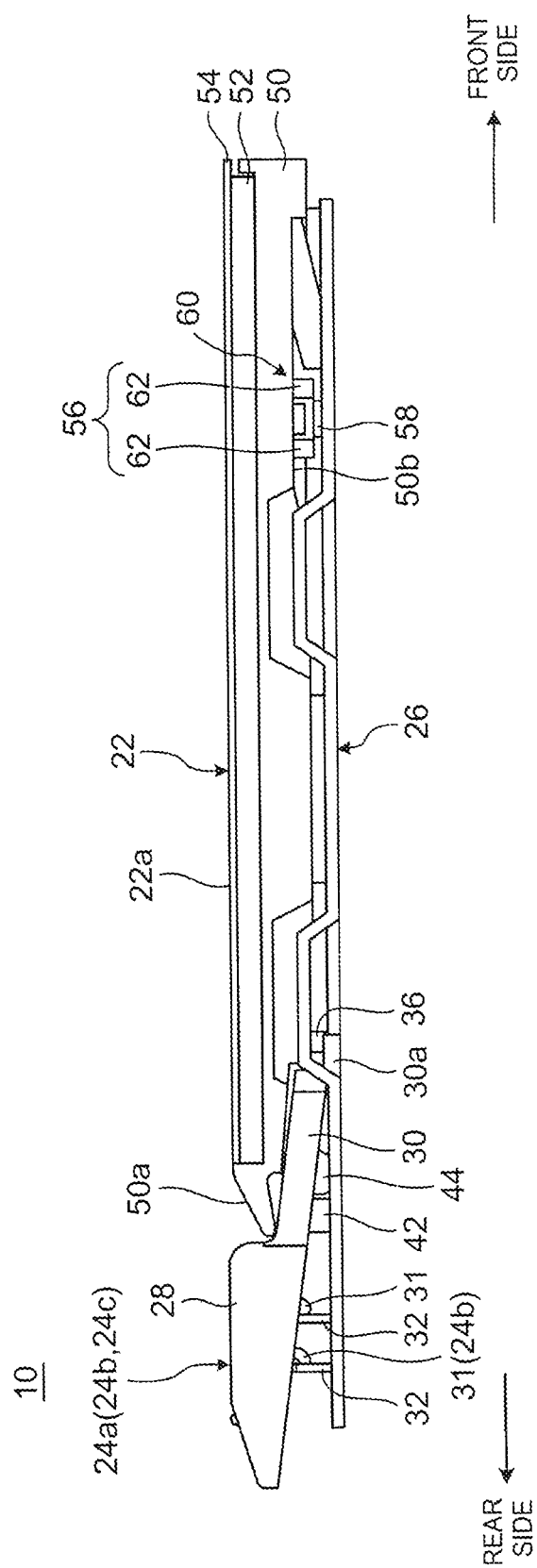
FIG. 3 is a left side view of the input device from FIG. 2.

FIG. 2 is a perspective view of the input device 10 according to a preferred embodiment of the present invention, and FIG. 3 is a left side view of the input device 10 shown in FIG. 2. As shown in FIG. 1 to FIG. 3, the input device 10 includes a touchpad 22 for accepting a touch operation by the approach or touch of a fingertip or the like, and three push buttons 24a, 24b, 24c arranged along the rear edge of the touchpad.

The push buttons 24a to 24c function in cooperation with the cursor operation by the pointing stick 20 or the touchpad 22, which are click buttons corresponding to the left button, the center button, and the right button of a typical mouse, respectively. The push buttons 24a to 24c may be arranged along the front edge of the touchpad 22, or arranged with the intervention of a frame of the main body chassis 14 between the push buttons and the touchpad 22.

The touchpad 22 is configured as a click pad capable of carrying out a click operation by a depressing operation in addition to the touch operation.

As shown in FIG. 2, pseudo button areas 25a, 25b are set on the front side of a touch operation surface 22a as the surface of the touchpad 22. Each of the pseudo button areas 25a, 25b on the touch operation surface 22a is defined by its coordinates and not visually recognized. When the touchpad 22 is depressed while touching either one of the pseudo button areas 25a, 25b with a fingertip, processing or display corresponding to the pseudo button area 25a, 25b is performed or provided. For example, the two pseudo button areas 25a, 25b correspond to the left button and the right button of the typical mouse, respectively.

The touchpad 22 and the push buttons 24a to 24c are supported by the upper face side of a base plate 26 as a metal plate-like member (see FIG. 2 and FIG. 3).

First, a specific configuration of the push buttons 24a to 24c will be described.

Figure 6:
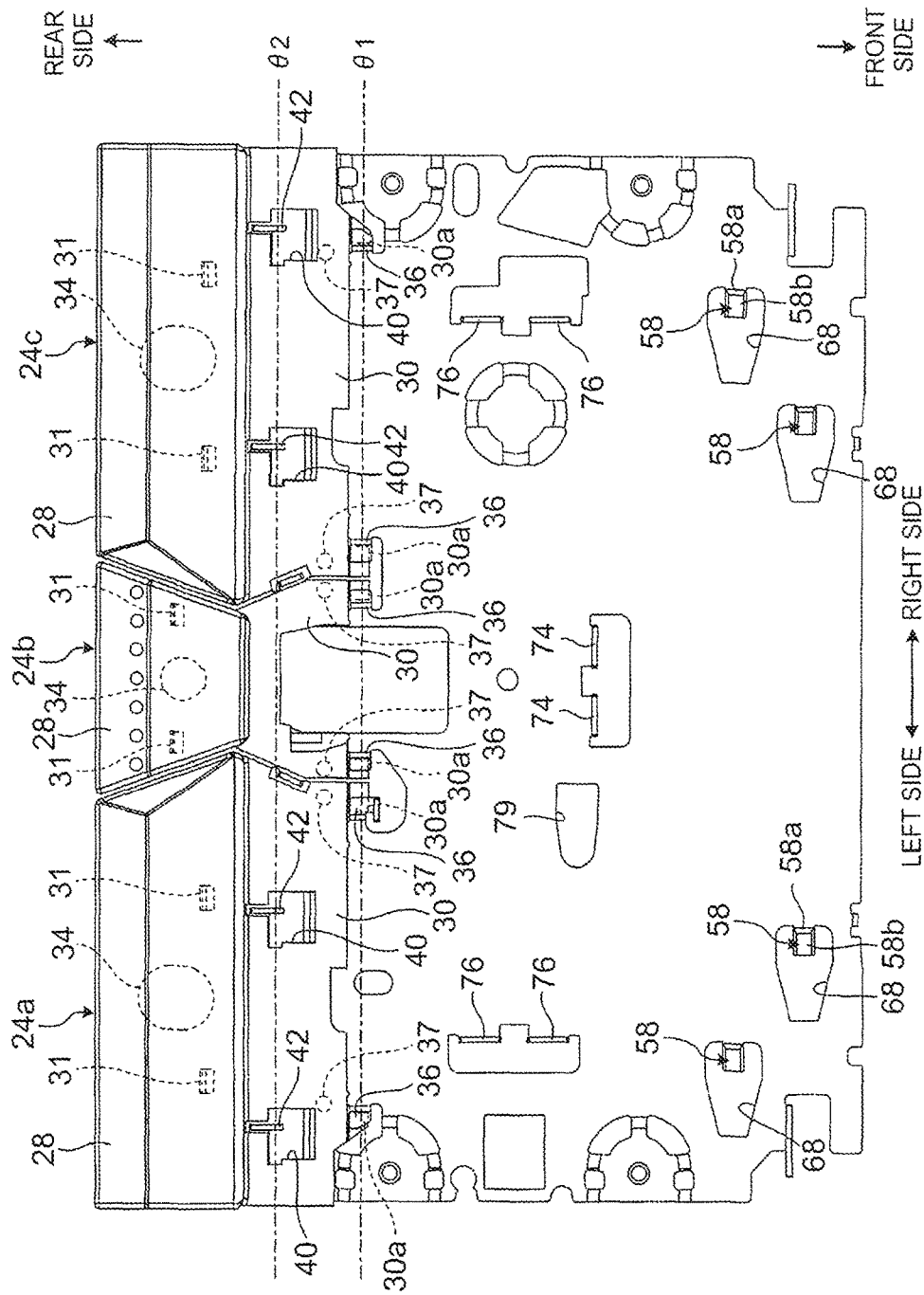
FIG. 6 is a top view of the push buttons and the base plate without a touchpad.
Figure 7:
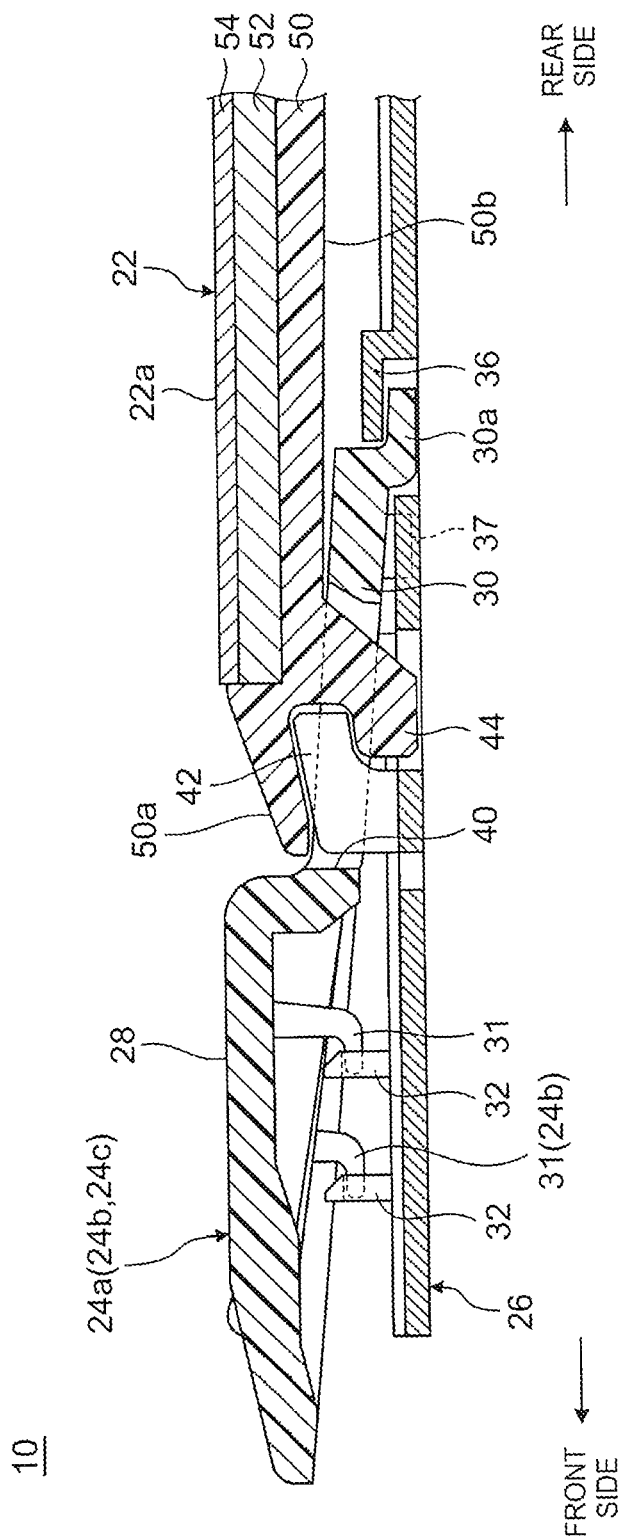
FIG. 7 is an enlarged left side sectional view showing the rear end side of the input device.

FIGS. 4A-4B are diagrams of the push buttons 24a to 24c, where FIG. 4A is a top view and FIG. 4B is a bottom view. FIGS. 5A-5B are diagrams of the base plate 26, where FIG. 5A is a top view and FIG. 5B is a right side view. FIG. 6 is a top view of the push buttons 24a to 24c and the base plate 26 when the touchpad 22 is de-mounted, and FIG. 7 is a left side sectional view schematically showing the rear end side of the input device 10 in an enlarged manner.

As shown in FIG. 2 to FIG. 4, the left push button 24a includes an operation face part 28 movable up and down to accept a depressing operation, and a hinge arm 30 projecting forward from the front edge of the operation face part 28.

The operation face part 28 is a button part provided along the rear edge of the touchpad 22. An inclined face inclined downward to the rear is provided at the rear edge of the operation face part 28 to enable a favorable depressing operation with a thumb, for example, while operating the pointing stick 20 with an index finger.

As shown in FIG. 3 and FIG. 4B, a pair of right and left engaging hooks 31, 31 are provided on the undersurface (reverse side) of the operation face part 28 to project downward. The engaging hooks 31 are engaged in engaging holes 32 formed upright on the top face of the base plate 26 in the shape of a gate (see FIG. 5 and FIG. 7) not only to define the rising limit of the push button 24a, but also to lock the push button 24a not to drop out upward.

A detection switch 34 is arranged substantially at the center of the undersurface of the operation face part 28 between the right and left engaging hooks 31, 31 (see FIG. 4B and FIG. 6). The detection switch 34 sends out a predetermined detection signal when the push button 24a is depressed. For example, the detection switch 34 is a switch expanded downward from the undersurface of the operation face part 28, and when the push button 24a is depressed, the detection switch 34 comes into contact with the base plate 26 and is turned on.

The hinge arm 30 projects downward to the front from the front edge of the operation face part 28 and is inserted into the undersurface side of the touchpad 22. A pair of right and left projecting pieces 30a bent first downward and then bent toward the front side to form a substantially L-shape are provided on the leading edge (front edge) of the hinge arm 30 (see FIG. 3, FIG. 4, and FIG. 7). A button hook (first hook) 36 raised from the base plate 26 and formed into a substantially L-shape in cross section is provided in a position where the button hook 36 overlaps each projecting piece 30a (see FIG. 5A and FIG. 7).

As shown in FIG. 7, the projecting piece 30a is rotatably (swingably) engaged with the button hook 36 to function as a hinge pivotally supporting the hinge arm 30 under the touchpad 22. The push button 24a has such a cantilever structure to allow the operation face part 28 to move up and down.

A positioning pin 37 is provided to project downward in a position near each projecting piece 30a on the undersurface (reverse side) of the hinge arm 30 (see FIG. 4B and FIG. 7). Respective positioning pins 37 are inserted into positioning holes 38 (see FIG. 5A) formed in the base plate 26 to position the push button 24a relative to the base plate 26.

A pair of right and left openings 40, 40 are provided substantially in central positions of the front and rear sides of the hinge arm 30. A pad hook (second hook) 42 formed upright from the base plate 26 and into a substantially L-shape in cross section is provided in a position where the pad hook 42 overlaps each opening 40 (see FIG. 6 and FIG. 7). As shown in FIG. 7, the pad hook 42 is arranged to be inserted into the opening 40 from bottom to top. The pad hook 42 is rotatably engaged with an engaging piece 44 of the touchpad 22 to be described later to function as a hinge to move the touchpad 22 up and down. The touchpad 22 has such a cantilever structure to allow the touch operation surface 22a to move up and down.

Note that the right-side push button 24*c* is bilaterally symmetrical to the left push button 24*a* as shown in FIG. 4, having substantially the same structure. Further, the center push button 24*b* has substantially the same structure in term of the up-and-down movement along with a depressing operation thereof, though the shape and size thereof are different from the push buttons 24*a*, 24*c*. Therefore, each element of these push buttons 24*b*, 24*c* having the same or similar function and effect as or to each element of the push button 24*a* is given the same reference numeral to omit the detailed description thereof.

In other words, the right push button 24*c* includes the operation face part 28 and the hinge arm 30. The engaging hooks 31 engaged in the engaging holes 32 of the base plate 26, and the detection switch 34 are provided in the operation face part 28. The projecting pieces 30*a* rotatably engaged with the button hooks 36 of the base plate 26, the positioning pins 37 inserted into the positioning holes 38 of the base plate 26, and the openings 40 into which the pad hooks 42 of the base plate 26 are inserted are provided in the hinge arm 30. Further, the center push button 24*b* has the operation face part 28 and the hinge arm 30. The engaging hooks 31 engaged in the engaging holes 32 of the base plate 26, and the detection switch 34 are provided in the operation face part 28. The projecting pieces 30*a* rotatably engaged with the button hooks 36 of the base plate 26, and the positioning pins 37 inserted in the positioning holes 38 of the base plate 26 are provided in the hinge arm 30. In the embodiment, although the openings 40 are not provided in the center push button 24*b*, the openings 40 into which the pad hooks 42 are inserted may be provided only in this push button 24*b* without providing any opening 40 in the other push buttons 24*a*, 24*c*. Next, a specific configuration of the touchpad 22 will be described.

As mentioned above, the touchpad 22 is a click pad capable of carrying out a touch operation on the touch operation surface 22*a* and a depressing operation to push down the touch operation surface 22*a*.

As shown in FIG. 2, FIG. 3 and FIG. 7, the touchpad 22 has a three-layer structure composed of a housing plate 50 as a bottom plate placed face to face with the base plate 26, a substrate plate 52 laminated on the top face of the housing plate 50 to detect a touch operation on the touch operation surface 22*a*, and a cover plate 54 laminated on the top of the substrate plate 52 so that the surface thereof will serve as the touch operation surface 22*a* for accepting the touch operation.

The substrate plate 52 is a substrate having a rectangular shape in plan view to serve as a sensor for detecting a touch operation on the cover plate 54. The substrate plate 52 is connected to the substrate in the main body chassis 14 by wiring, not shown. The cover plate 54 is a glass plate or a resin plate having a rectangular shape in plan view.

Figure 8:
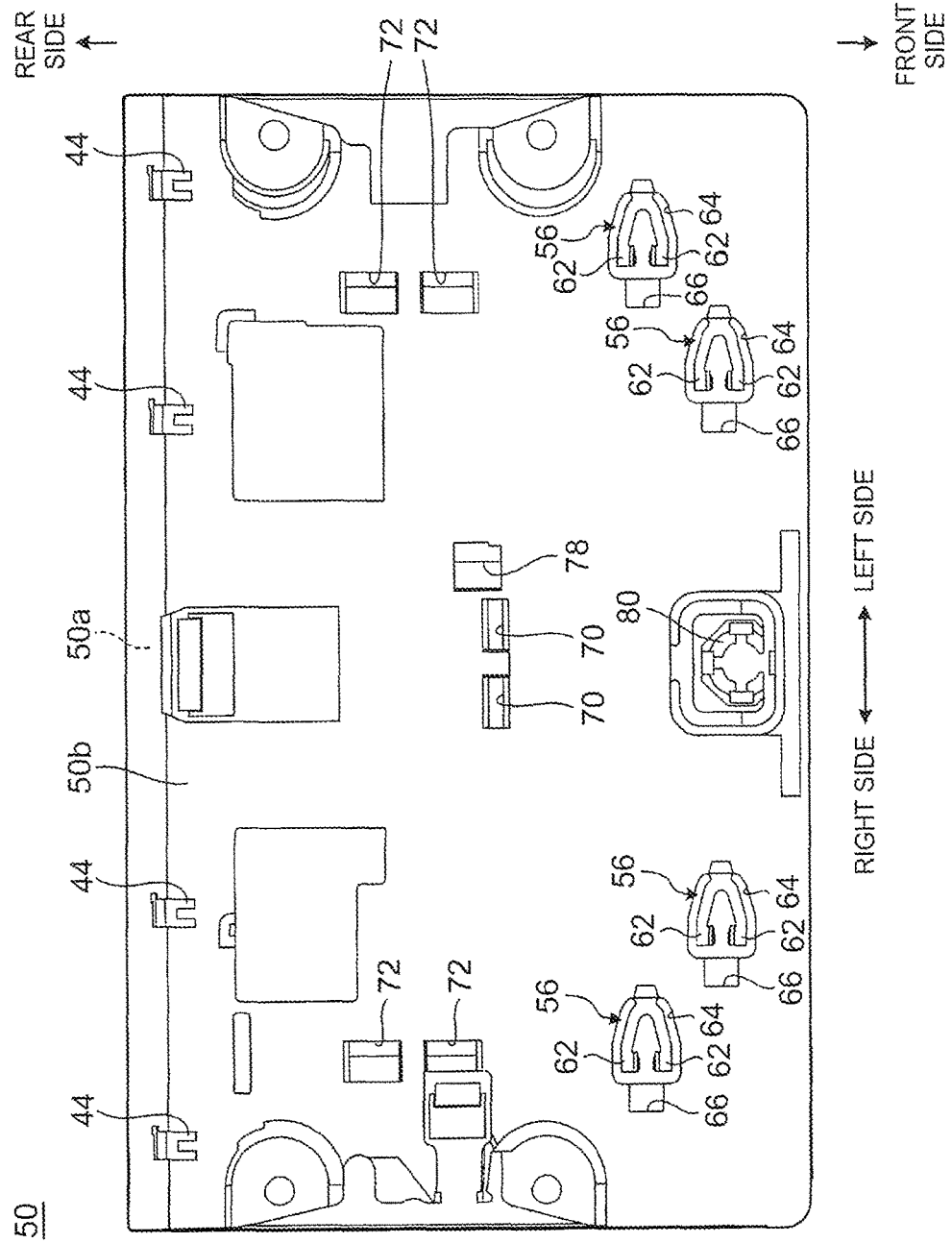
FIG. 8 is a bottom view of a housing plate.

FIG. 8 shows a bottom view of the housing plate 50.

As shown in FIG. 2, FIG. 3, and FIG. 8, the housing plate 50 is a resin plate having a rectangular shape in plan view to serve as a chassis member for retaining the substrate plate 52 and the cover plate 54. An inclined face 50*a* inclined downward is formed on the rear edge of the housing plate 50. The rear end face of the inclined face 50*a* comes close to the front end face of the operation face part 28 of each of the push buttons 24*a* to 24*c* (see FIG. 7). The inclined face 50*a* is so provided that the touchpad 22 will not get in the way during depressing operations of the push buttons 24*a* to 24*c* to carry out the depressing operations successfully over the whole surfaces of the operation face parts 28.

As shown in FIG. 7, the engaging piece 44 is provided on the undersurface so of the housing plate 50 in a position below the inclined face 50*a*. For example, four engaging pieces 44 are provided in parallel with each other in the right-and-left direction (see FIG. 8). As mentioned above, each of the engaging pieces 44 is rotatably engaged with each of the pad hooks 42 exposed from each of the openings 40 of the left and right push buttons 24*a*, 24*c* to serve as a hinge to move (turn) the touchpad 22 up and down in the cantilever structure.

As shown in FIG. 3 and FIG. 8, two pairs of right and left latches 56, i.e., four latches 56 in total are provided on the front end side of the housing plate 50. Each latch 56 is engaged with a coupling hook (hook) 58 formed upright on the top face of the base plate 26 into an L-shape in cross section. These latches 56 and coupling hooks 58 form a coupling structure 60 for coupling the housing plate 50 to the base plate 26 in a direction where the housing plate 50 is put on the base plate 26, functioning not only to define the rising limit of the touchpad 22, but also to lock it not to drop out upward.

Figure 9:
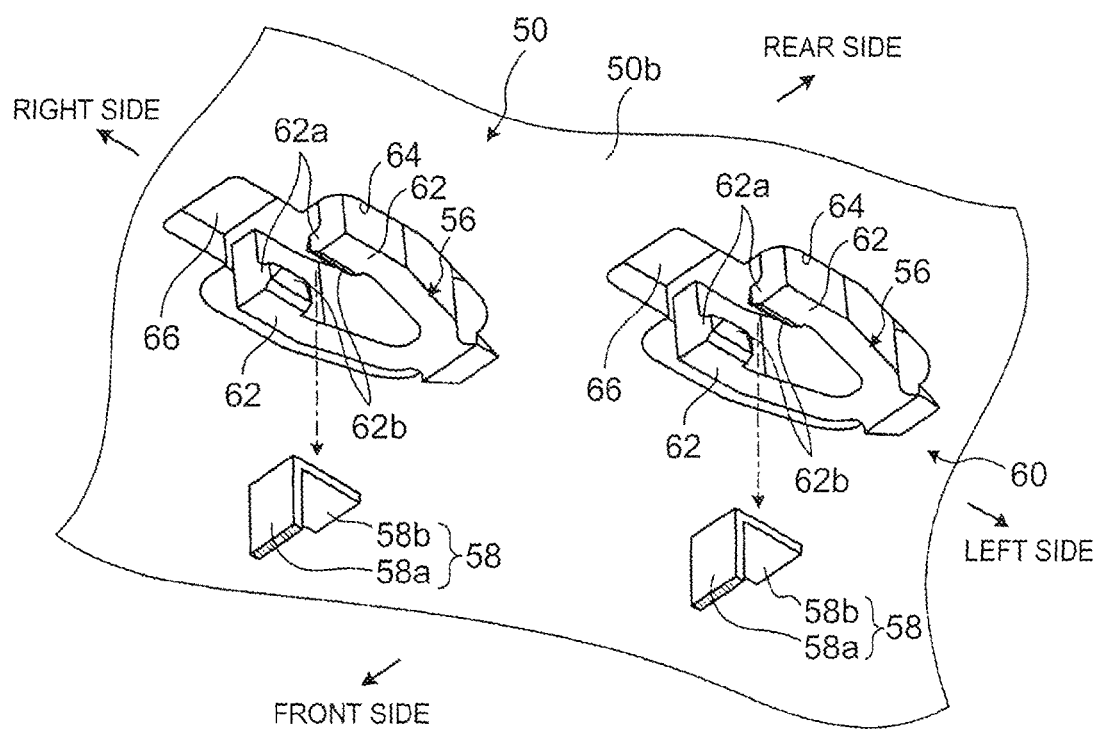
FIG. 9 is an enlarged perspective view of a main section of the housing plate as viewed from the undersurface side.
Figure 10A:
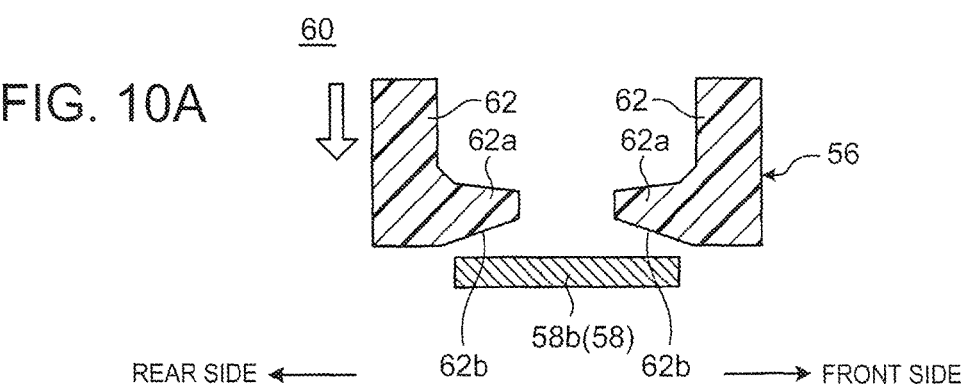
FIGS. 10A-10C are explanatory sectional views showing assembling processes of latches and a coupling hook.
Figure 10B:
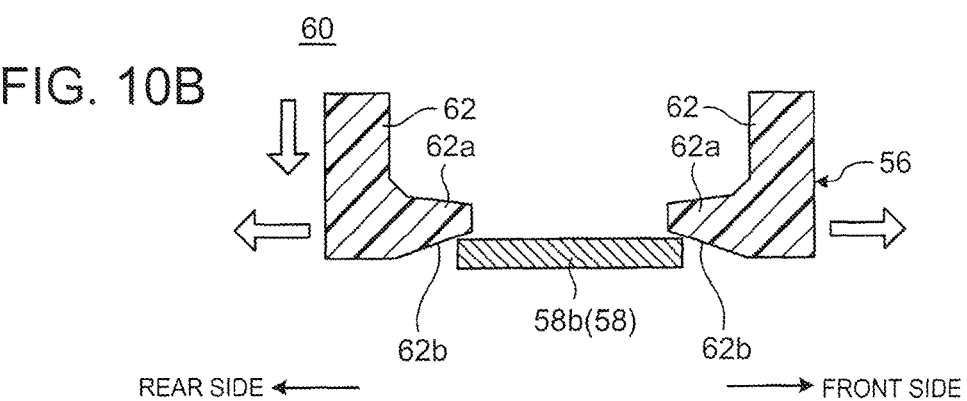
Figure 10C:
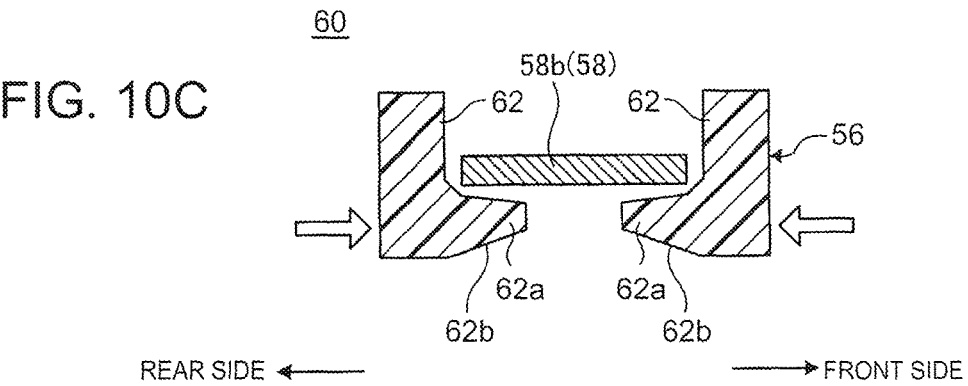
Figure 11:
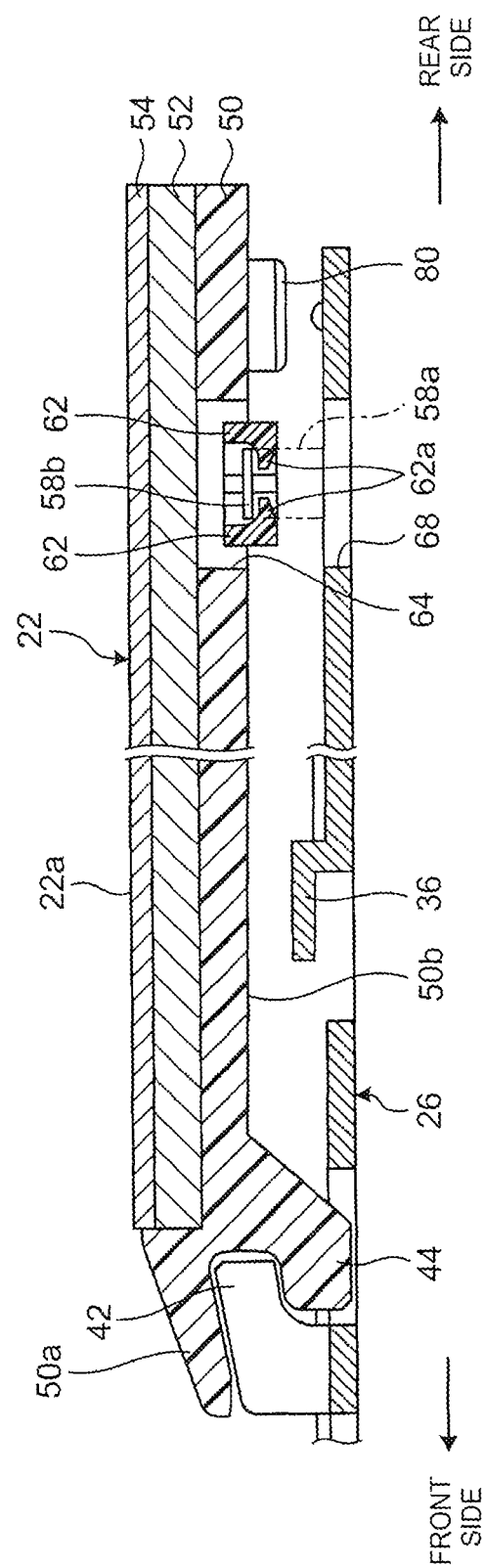
FIG. 11 is a left side sectional view showing the touchpad.

FIG. 9 is an enlarged perspective view of a main section of the housing plate 50 as viewed from the undersurface side, i.e., an explanatory view showing the structure of the latches 56. FIGS. 10A-10C are explanatory sectional views showing assembling processes of the latches 56 and the coupling hook 58. FIG. 11 is a left side sectional view showing the touchpad 22.

As shown in FIG. 8 and FIG. 9, the latches 56 extend in a direction parallel with a coupling face (undersurface) 50*b* of the housing plate 50 to the base plate 26, and each has a pair of arm members 62, 62 whose tips are spaced out from each other. The latch 56 is arranged inside a hole portion 64 formed through the housing plate 50 in a position downwardly deviated from the coupling face 50*b* of the housing plate 50 (see FIG. 3 and FIG. 11).

The pair of arm members 62, 62 are formed into a V-shape opened from the base end side (left side) toward the distal end side (right side) in the direction spaced out from each other. All the latches 56 are so set that the projecting directions of the pair of arm members 62, 62, i.e., the V-shape directions will be directed in the same direction (right side).

Projecting pieces 62*a* that project to face each other are provided in lower portions of the distal ends of the respective arm members 62. As shown in FIG. 9 and FIGS. 10A-10C, inclined faces 62*b* inclined downward from the distal ends to face each other toward the base end from which the distal ends are spaced out are formed on the undersurface of the respective projecting pieces 62*a*.

As shown in FIG. 9, each of the coupling hooks 58 has a vertical portion 58*a* standing vertically upward from the top face of the base plate 26 and a horizontal portion 58*b* bent from the upper end of the vertical portion 58*a* in the horizontal direction to form an L-shape in cross section. The horizontal portion 58*b* projects toward a direction (left side) opposite to the V-shape direction (right side) of the latch 56 as the projecting direction of each of the arm members 62.

A rectangular clearance hole 66 communicating with each hole portion 64 on the right side thereof is provided in the coupling face 50*b* of the housing plate 50 (see FIG. 8 and FIG. 9). The clearance hole 66 is a clearance portion for the coupling hook 58 when the touchpad 22 moves up and down. Further, a clearance hole 68 having substantially the same shape as the hole portion 64 of the housing plate 50 is provided near each coupling hook 58 of the base plate 26.

The clearance hole 68 is a clearance portion for the latch 56 when the touchpad 22 moves up and down.

Figure 13A:
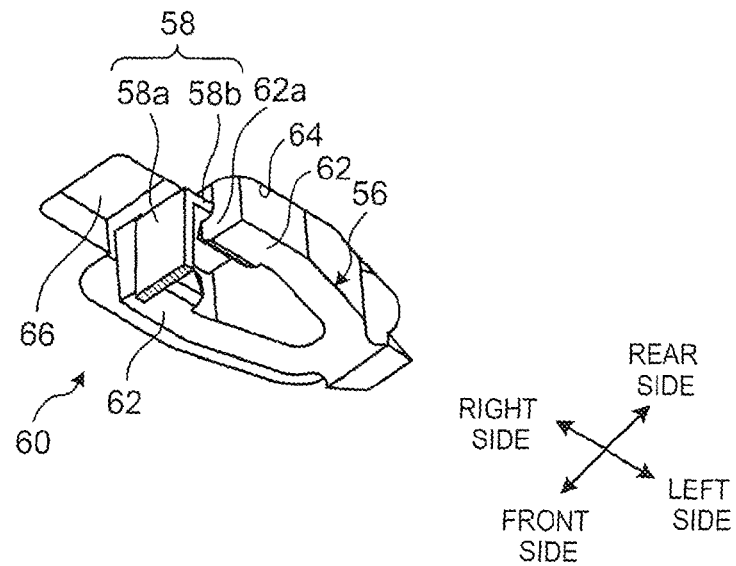
FIGS. 13A-13B are perspective views around a latch as viewed from the undersurface side to show the disassembly method of the housing plate and the base plate, where

In the state where the latch 56 and the coupling hook 58 are engaged, the horizontal portion 58b of the coupling hook 58 is "sandwiched" between both arm members 62, 62 and placed on the top face side of the projecting pieces 62a as shown in FIG. 10C and FIG. 11 (also see FIG. 13A). Since each projecting piece 62a is provided only in the lower portion of each of the distal ends of the arm members 62 facing each other, the coupling hook 58 is relatively movable in the up-and-down direction while being engaged with the arm members 62 (also see FIG. 16).

In the housing plate 50, as shown in FIG. 8, a pair of right and left X-positioning holes 70, 70 are provided substantially at the center, and pairs of front and rear Y-positioning holes 72, 72 are provided both on the right and left sides, respectively. An X-positioning piece 74 (see FIG. 5) formed upright on the top face of the base plate 26 is fitted in each X-positioning hole 70 to form a positioning portion to perform positioning and prevent a positional displacement between the housing plate 50 and the base plate 26 in the right-and-left direction, respectively. An Y-positioning piece 76 (see FIG. 5) formed upright on the top face of the base plate 26 is fitted in each Y-positioning hole 72 to form a positioning portion to perform positioning and prevent a positional displacement between the housing plate 50 and the base plate 26 in the front-rear direction and the rotational direction, respectively.

A depressed portion 78 depressed upward by one step is provided on the left side of the X-positioning holes 70 of the housing plate 50 (see FIG. 8). Further, a tool insertion hole 79 is provided in a position near the depressed portion 78 of the base plate 26 (see FIG. 5A). The tool insertion hole 79 is a hole portion into which a tool T (see FIG. 12B) is inserted when the housing plate 50 and the base plate 26 are de-mounted from each other in a manner to be described later. The depressed portion 78 is a portion for placing the tip of the tool T inserted from the tool insertion hole 79 on the reverse side of the base plate 26 so as to come into contact therewith.

As shown in FIG. 8 and FIG. 11, a detection switch 80 is arranged near the front edge of the housing plate 50 substantially at the center of the undersurface thereof. The detection switch 80 sends a predetermined detection signal when the touchpad 22 is depressed. The detection switch 80 is, for example, a switch expanded downward from the undersurface of the housing plate 50, and when the touchpad 22 is depressed, the detection switch 80 comes into contact with the base plate 26 and is turned on (see FIG. 16).

Next, one procedure of an assembly method and a disassembly method for the coupling structure 60 for coupling the housing plate 50 (touchpad 22) to the base plate 26 will be described.

When the housing plate 50 is coupled to the base plate 26, the engaging piece 44 projecting from the opening 40 of each of the push buttons 24a, 24c assembled on the base plate 26 is first engaged with the pad hook 42 (see FIG. 7).

Then, in the state where each X-positioning hole 70 and each X-positioning piece 74, and each Y-positioning hole 72 and each Y-positioning piece 76 are positioned, and further each latch 56 and the coupling hook 58 are positioned, the housing plate 50 is depressed toward the base plate 26. As a result, as shown in FIG. 10B, the horizontal portion 58b of the coupling hook 58 slidingly contact the inclined face 62b formed on the undersurface of the projecting piece 62a of each arm member 62 to be warped and deformed in a direction in which the respective arm members 62 are spaced out from each other (the direction to open up the V-shape). Here, since each arm member 62 extends in parallel with the coupling face 50b, a sufficient flexural amount is secured.

Figure 12A:
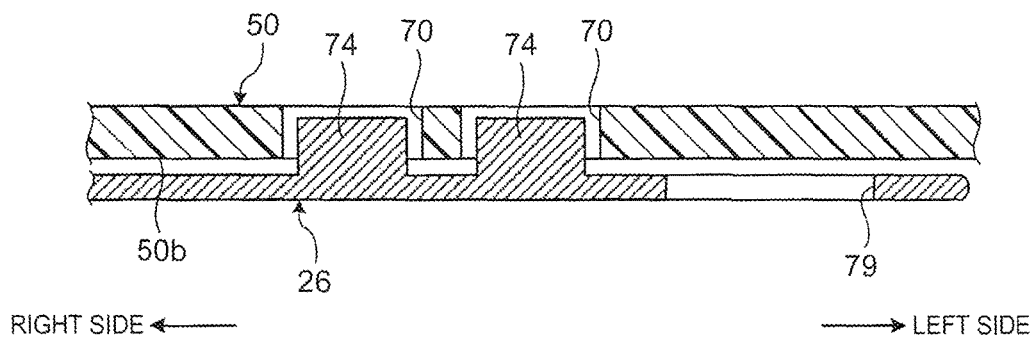
FIGS. 12A-12B are sectional views around a tool insertion hole to show a disassembly method of the housing plate and the base plate, where

Then, when the horizontal portion 58b climbs over the projecting pieces 62a, the respective arm members 62 are restored again to the initial state as shown in FIG. 10C and FIG. 13A to place the horizontal portion 58b between both arm members 62, 62, thus completing the coupling of the latch 56 and the coupling hook 58. Substantially at the same time, each X-positioning hole 70 is fitted to each X-positioning piece 74, and each Y-positioning hole 72 is fitted to each Y-positioning piece 76. Thus, the base plate 26 and the housing plate 50 (touchpad 22) are coupled, and the assembly work is completed (see FIG. 3, FIG. 11, and FIG. 12A).

Next, when the base plate 26 thus coupled is removed from the housing plate 50 and disassembled, the input device 10 is first turned upside down, and the tool T is inserted into the tool insertion hole 79 from the undersurface of the base plate 26.

Figure 12B:
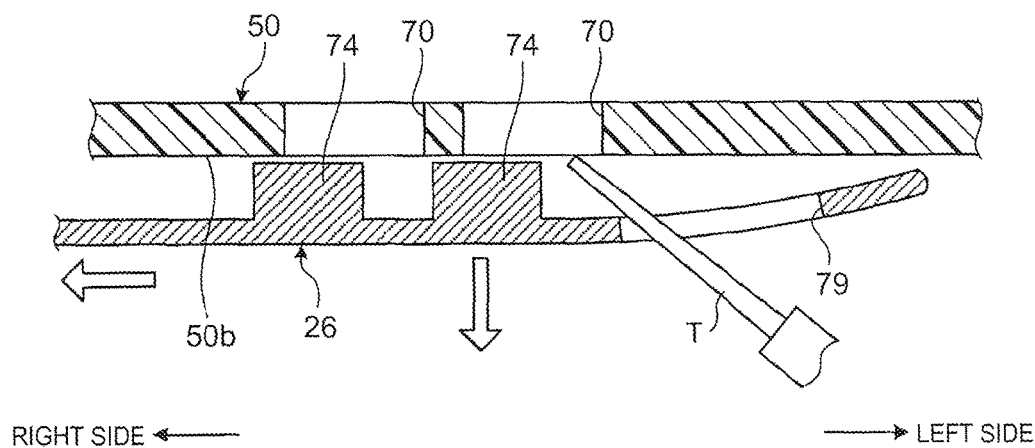
Figure 13B:
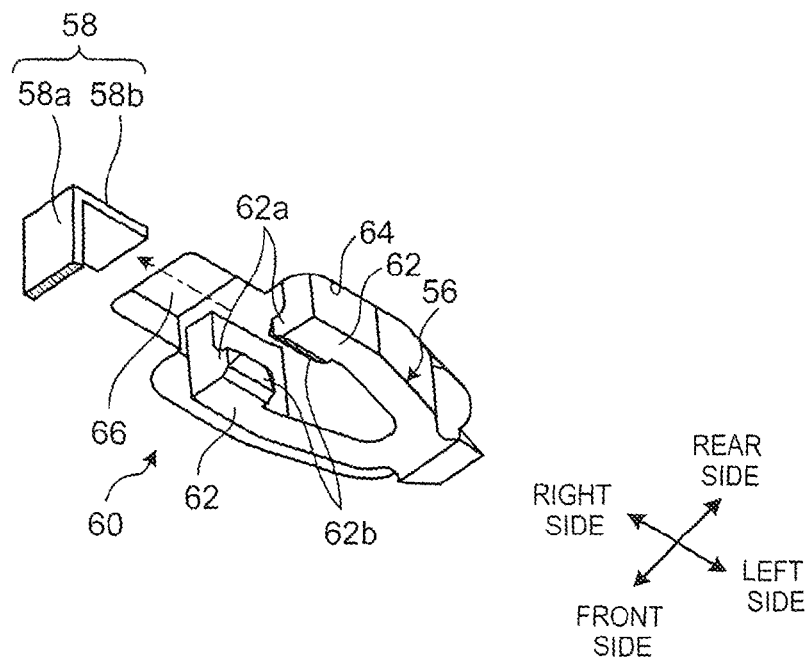

Then, the tip of the tool T is inserted into the right side and placed in the depressed portion 78 of the housing plate 50 on the inner face (top face) side of the base plate 26 to lever up the base plate 26 with the tool T as shown in FIG. 12B. Since this causes the base plate 26 to be warped downward so as to release the fitting state between each X-positioning hole 70 and each X-positioning piece 74, the base plate 26 is slid and moved as-is to the right through the tool T. In other words, the base plate 26 is moved to the right relative to the housing plate 50. As a result, as shown in FIG. 13B, the leading edge of the horizontal portion 58b of the coupling hook 58 is removed from the arm members 62, 62 of the latch 56 and hence the coupling state of the coupling structure 60 is released. After that, the disassembly work is completed merely by dismounting the housing plate 50 (touchpad 22) from the base plate 26. Next, an example of the operation of the input device 10 will be described.

Figure 14:
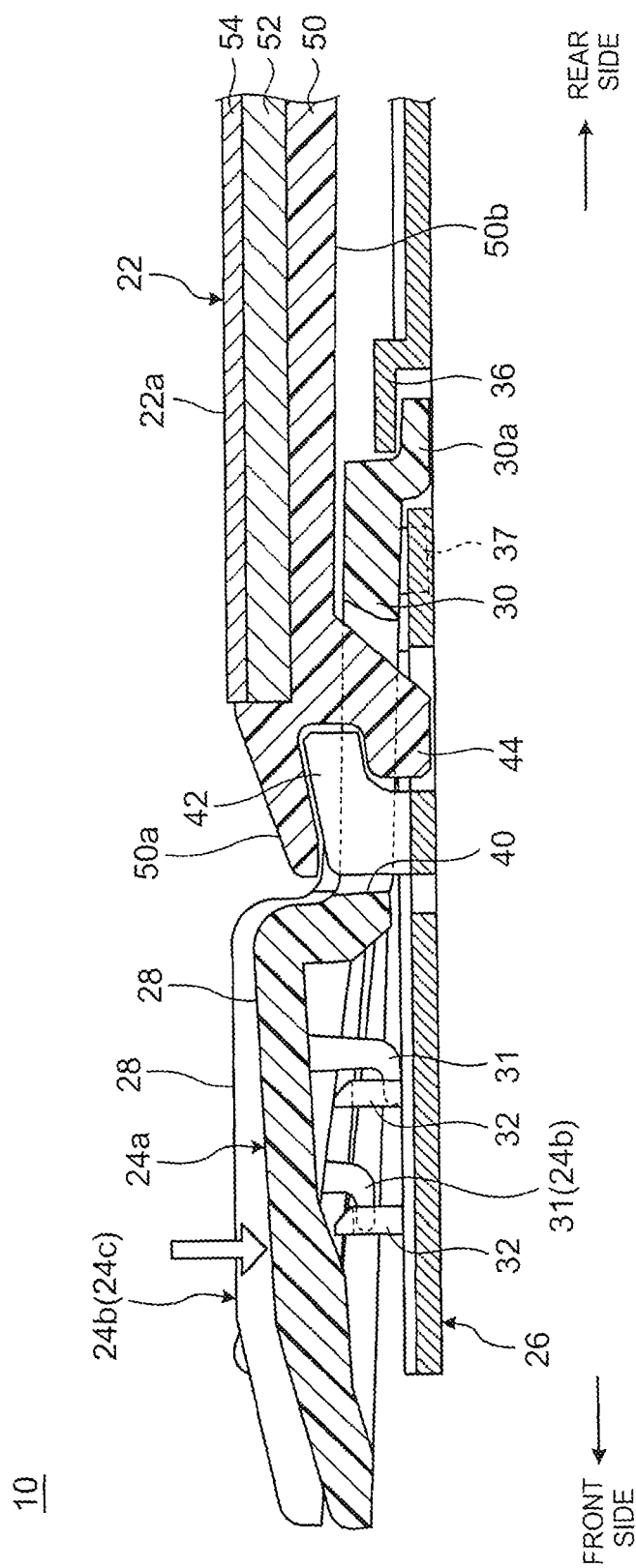
FIG. 14 is a sectional view showing a state where the push button is depressed.

First, for example, when the push button 24a is depressed, the projecting piece 30a provided on the leading edge of the hinge arm 30 is turned with respect to the button hook 36, and this portion serves as a turning axis θ1 (see FIG. 6) to cause the operation face part 28 to move downward as shown in FIG. 14.

At this time, since the projecting piece 30a as a hinge (turning axis θ1) for up-and-down movement of each of the push buttons 24a to 24c is provided on the leading edge of the hinge arm 30 that extends from the front end face of the operation face part 28 to the undersurface side of touchpad 22, the whole surface of the operation face part 28 can be depressed to achieve high operability. Further, during a depressing operation, since the engaging hooks 31 moves downward inside the engaging holes 32, the up-and-down movement of the operation face part 28 can be guided to provide a good operational feeling with little backlash. Note that the push buttons 24b, 24c can also be depressed in the same manner.

Figure 15:
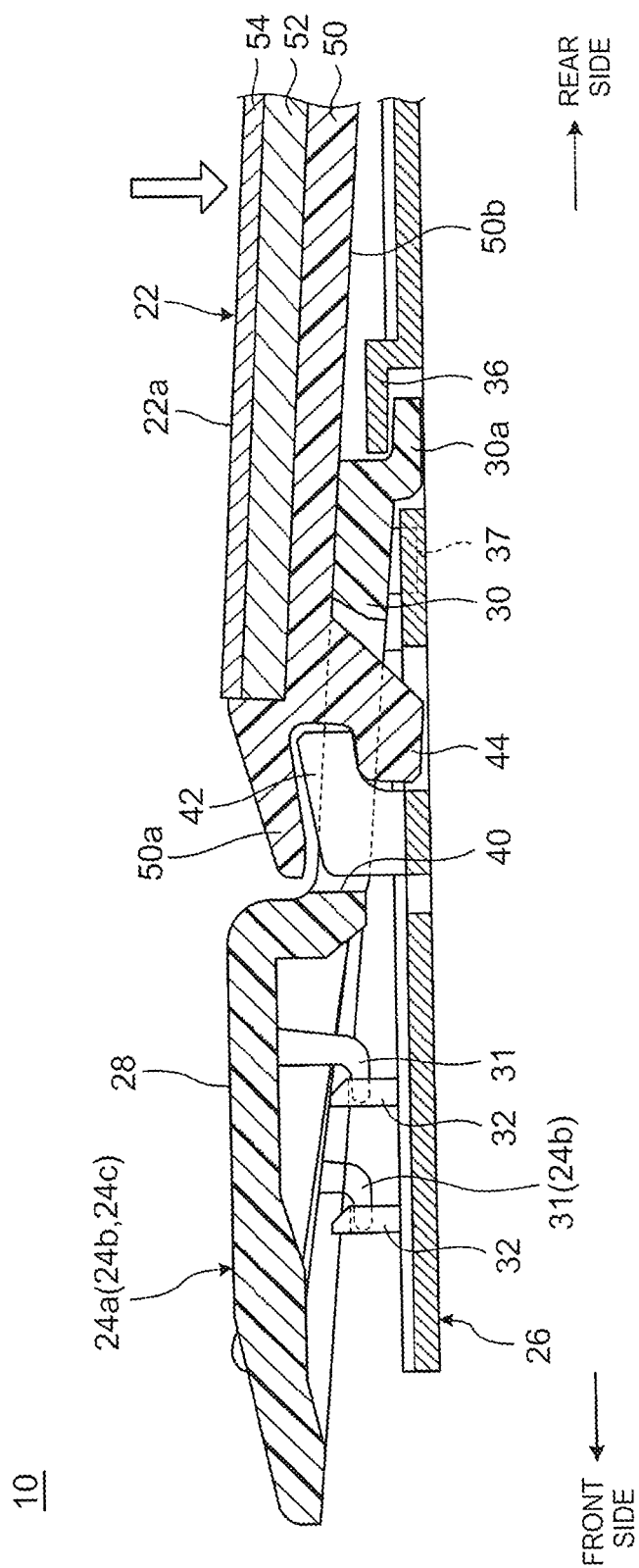
FIG. 15 is a sectional view showing a state where the touchpad is depressed.
Figure 16:
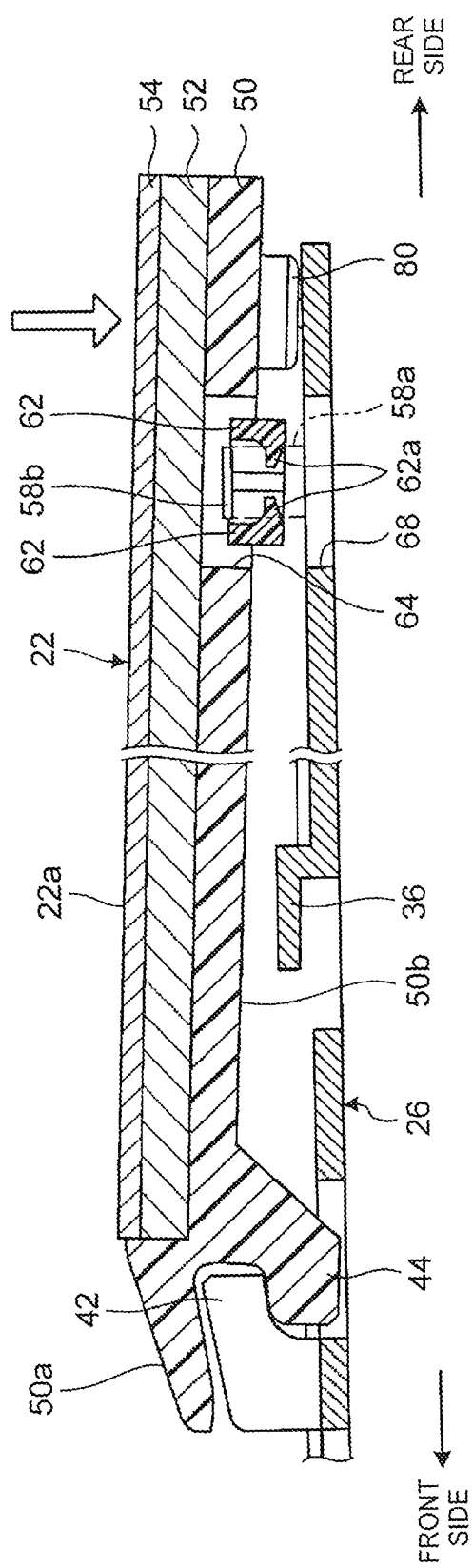
FIG. 16 is a sectional view showing a state of the latch when the touchpad is depressed.

Next, when the touchpad 22 is depressed, the engaging piece 44 on the rear end side is turned with respect to the pad hook 42 as shown in FIG. 15 and FIG. 16, and this portion serves as a turning axis θ2 (see FIG. 6) to cause the touchpad 22 to move downward.

At this time, since the engaging piece 44 as a hinge (turning axis θ2) for up-and-down movement of the touchpad 22 is provided on the rear side of the touch operation surface 22a, good operability is secured at the time of a depressing operation while touching the pseudo button area 25a, 25b set on the front end side of the touch operation surface 22a. During the depressing operation, since the latches 56 move downward under the engagement with the coupling hooks 58, the up-and-down movement of the touchpad 22 can be guided to provide a good operational feeling with little backlash. Further, the inclined face 50a on the rear edge of the touchpad 22 does not move up and down because it is provided in a position above the engaging pieces 44 and the pad hooks 42 as hinges for up-and-down movement. This has the advantage of preventing the touchpad 22 from being depressed by mistake when the operation face part 28 of any of the push buttons 24a to 24c is depressed.

As described above, the input device 10 includes the touchpad 22 for accepting a touch operation, and the push buttons 24a to 24c provided adjacent to one edge of the touchpad 22, wherein each of the push buttons 24a to 24c has a cantilever structure including the operation face part 28 movable up and down to accept a depressing operation and the hinge arm 30, which projects from one edge of the operation face part 28 to the undersurface side of the touchpad 22 and the leading edge of which is pivotally supported under the touchpad 22.

Thus, since each of the push buttons 24a to 24c has the cantilever structure using the hinge arm 30 projecting into the undersurface side of the touchpad 22 and pivotally supported, the input device 10 can be made significantly thin compared with the conventional structure using the pantograph structure or the like. Further, since the hinge is not arranged under the operation face part 28, the whole surface of the operation face part 28 can be depressed to achieve high operability. Further, since the number of parts can be reduced compared with the case of using the pantograph structure or the like, the cost of the input device 10 can be reduced and the productivity thereof can be improved.

In the input device 10, the projecting pieces 30a and the button hooks 36 as the turning axis θ1 of each of the push buttons 24a to 24c are arranged under the touchpad 22, and the engaging pieces 44 as the turning axis θ2 of the touchpad 22 are rotatably engaged with the pad hooks 42 inserted into the openings 40 of the hinge arm 30. Thus, since the hinge arm 30 of the push button 24a-24c intersects with the engaging pieces 44 of the touchpad 22, the input device 10 can further be made thinner. Further, since the turning axes θ1 and θ2 can be placed and housed on the undersurface side of the touchpad 22, the general configuration can be downsized.

The coupling structure 60 is a structure of coupling in a direction in which the housing plate 50 as a resin chassis member overlaps with the base plate 26 as a metal plate-like member, where the housing plate 50 includes the latches 56 each having a pair of arm members 62, 62 extending along a direction parallel with the coupling face 50b to the base plate 26 and in which the tips thereof are spaced out from each other, and the base plate 26 includes the coupling hooks 58, each of which is formed upright toward the side of the housing plate 50 to be engaged between the pair of arm members 62, 62.

Since each of the latches 56 on the side of the housing plate 50 is made up of the pair of arm members 62, 62, all that is required is to push the housing plate 50 in the direction to overlap the base plate 26 so that the pair of arm members 62, 62 in contact with the coupling hook 58 will be flexed and deformed properly. Therefore, the latch 56 can be easily engaged with the coupling hook 58, and this can couple the housing plate 50 to the base plate 26 with high assembling efficiency while preventing each arm members 62 from being damaged. Further, since the arm member 62 extends along the direction parallel with the coupling face 50b to the base plate 26, an increase in size in the thickness direction can be avoided while securing a sufficient flexural amount, and this also contributes to making the input device 10 and the electronic device 12 thinner. In addition, since the latch 56 can sandwich the coupling hook 58 between the pair of arm members 62, 62, the engaging state is made hard to come off even when an impact is given or the like, and hence the housing plate 50 and the base plate 26 can be coupled with high coupling strength.

In the coupling structure 60, when the housing plate 50 is connected to the base plate 26, since the pair of arm members 62, 62 have only to be pressed from the surface side of the coupling hook 58 to flex respective arm members 62 in the direction to be spaced out from each other in order to engage the projecting pieces 62a with the coupling hook 58 on the back face side thereof, the productivity is high. On the other hand, when the housing plate 50 is de-mounted from the base plate 26, since the base plate 26 can be moved relative to the housing plate 50 in a direction parallel with the coupling face 50b to remove the projecting pieces 62a from the leading edge of the coupling hook 58 in order to release the engaging state, the disassembly is also easy. In addition, since the disassembly procedure is different from the assembly procedure, both the impact resistance and the ease of disassembly can be achieved without a trade-off therebetween.

As has been described, the present disclosure provides an input device having a touchpad for accepting a touch operation and a push button for accepting a depressing operation.

While the disclosure has been particularly shown and described with reference to a preferred embodiment, it will be understood by those skilled in the art that various changes in form and detail may be made therein without departing from the spirit and scope of the disclosure.

In the aforementioned embodiment, the configuration in which the touchpad 22 is configured as a click pad movable up and down is illustrated, but the present invention is also applicable to a typical touchpad in such a configuration that the push buttons 24a to 24c including the hinge arm 30 do not move up and down. Further, the configuration in which the three push buttons 24a to 24c are arranged side by side is illustrated above, but the number and arrangement of installed buttons can be changed appropriately.

Figure 17:
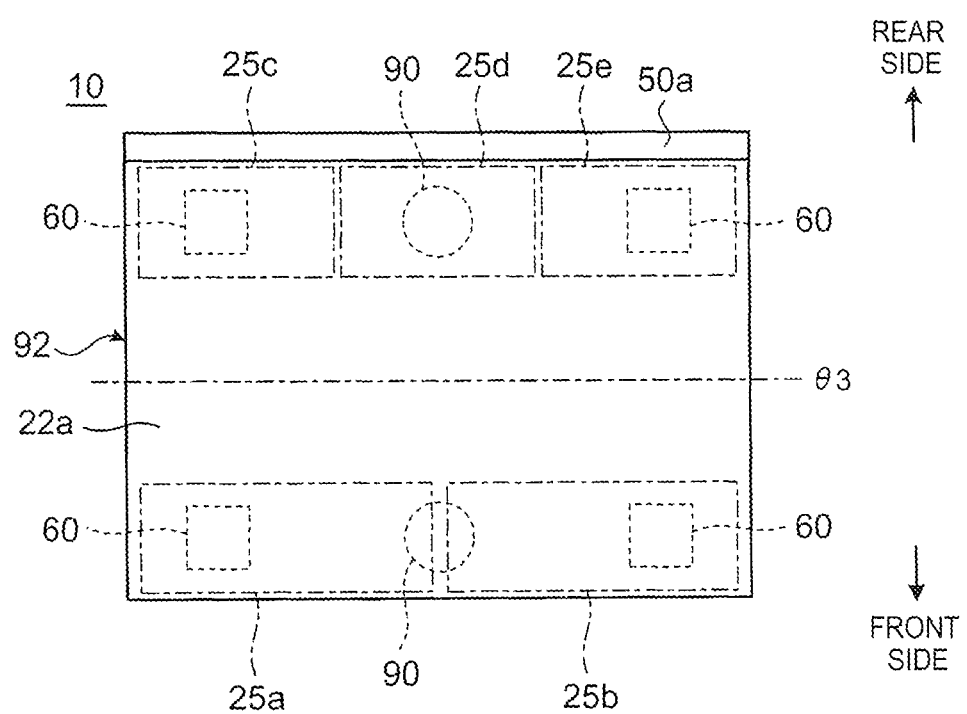
FIG. 17 is a top view of a touchpad in accordance with an alternative embodiment.

In the aforementioned embodiment, the configuration in which the coupling structure 60 is used to couple the touchpad 22 and the base plate 26 is illustrated, but this coupling structure can also be used to connect other parts as long as a resin chassis member is coupled to a metal plate-like member in a direction to overlap the resin chassis member with the metal plate-like member. Further, the coupling structure 60 can also be applied to a touchpad other than the touchpad 22 in the cantilever structure, for example, to a touchpad 92 in a seesaw structure having a turning axis θ3 substantially at the center of the touch operation surface 22a in the front-rear direction as shown in FIG. 17 to turn on detection switches 90 similar to the detection switch 80 and provided on the front and rear edge sides while providing the latches 56 and the coupling hooks 58 on the front and rear edge sides of the touchpad, 92. In this touchpad 92, for example, pseudo button areas 25c, 25d, 25e can also be set in addition to the pseudo button areas 25a, 25b.

What is claimed is:
1. A coupling structure comprising:
a metal plate-like member;
a resin chassis member includes a latch having a pair of arm members extending along a direction parallel with a coupling face to said plate-like member and whose distal ends are spaced out from each other; and a hook in said plate-like member, wherein said hook is formed upright towards said chassis member side and engaged between said pair of arm members, such that said coupling structure couples said chassis member to said plate-like member in a direction to overlap said chassis member with said plate-like member.

2. The coupling structure of claim 1, wherein said latch is formed into a V-shape open up in a direction in which said pair of arm members are spaced out from each other from a base end side to a distal end side.

3. The coupling structure of claim 2, wherein projecting pieces that project in a direction to face each other are provided at said distal ends of said pair of arm members, respectively; and said chassis member is coupled to said plate-like member in a state where said projecting pieces are engaged with a back side of said hook.

4. The coupling structure of claim 3, wherein when said chassis member is connected to said plate-like member, said pair of arm members are pressed from a front side of said hook to flex the respective arm members in the direction to be spaced out from each other in order to engage said projecting pieces with the back side of said hook;

while when said chassis member is de-mounted from said plate-like member, said plate-like member is moved relative to said chassis member in a direction parallel with the coupling face to remove said projecting pieces from a leading edge of said hook in order to release said engaging state.

5. The coupling structure of claim 4, wherein a plurality of said latches are so provided that projecting directions of pairs of arm members provided in all of said latches are set in an identical direction.

6. The coupling structure of claim 5, further comprising a positioning part having a positioning piece, which projects from one of said plate-like member and said chassis member, and a positioning hole, which is provided in the other one of said plate-like member and said chassis member and in which the positioning piece is engaged, to prevent the relative movement between said chassis member and said plate-like member by engaging the positioning piece and said positioning hole, wherein said plate-like member is warped toward the overlapped direction to be able to release said engaging state between said positioning piece and said positioning hole.

7. An input device comprising:

a touchpad configured to receive a touch operation;

a push button located adjacent to one edge of said touchpad, wherein said push button has a cantilever structure having an operation face part movable up and down to receive a depressing operation, and a hinge arm, which projects from one edge of said operation face part into an undersurface side of said touchpad and a leading edge of which is pivotally supported under said touchpad; and a coupling structure to couple a chassis member as a bottom surface member of said touchpad and a plate-like member as a base plate for supporting said touchpad, wherein said coupling structure includes a metal plate-like member;

a resin chassis member includes a latch having a pair of arm members extending along a direction parallel with a coupling face to said plate-like member and whose distal ends are spaced out from each other; and a hook in said plate-like member, wherein said hook is formed upright towards said chassis member side and engaged between said pair of arm members, such that said coupling structure couples said chassis member to said plate-like member in a direction to overlap said chassis member with said plate-like member.

8. The input device of claim 7, wherein said touch pad is supported to be movable up and down with respect to said base plate to be able to accept a click operation; and said pair of arm members are locked by said hook to define a rising limit of said touch pad.

\* \* \* \* \*